Dec. 18, 1962  J. A. THOMAS  3,069,087
PROPORTIONING TYPE OF CONDITION CONTROL SYSTEM
Filed April 16, 1958
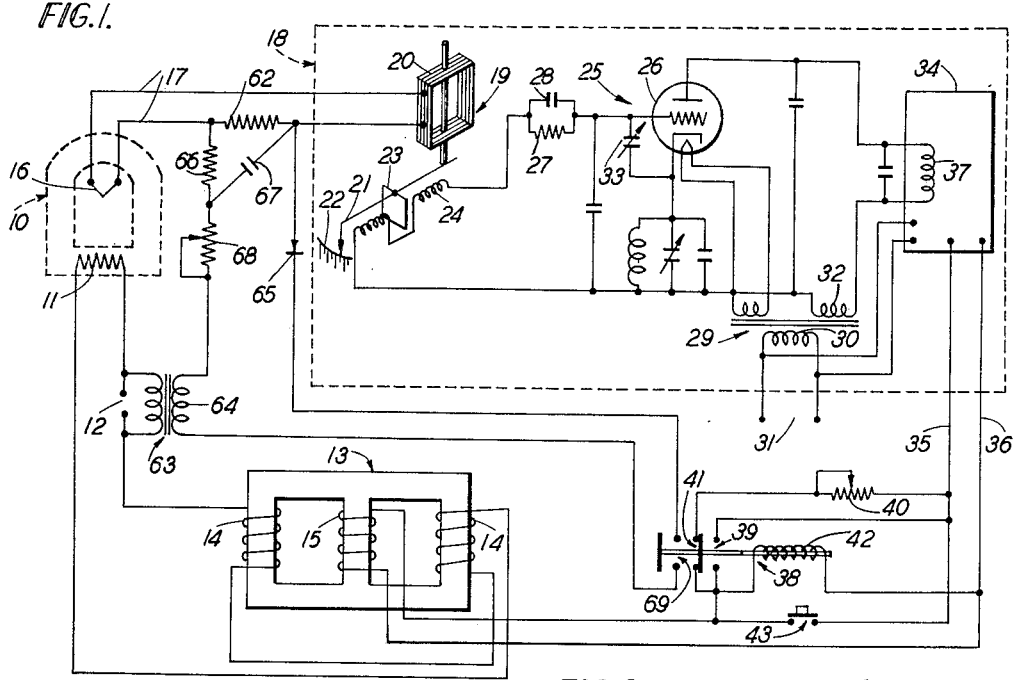
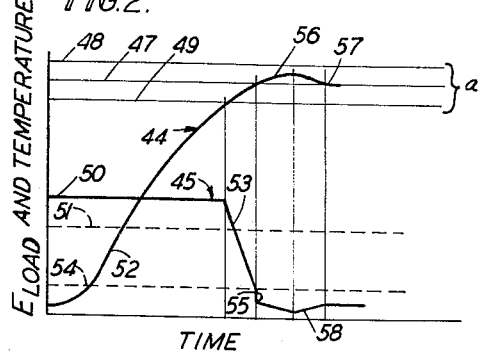
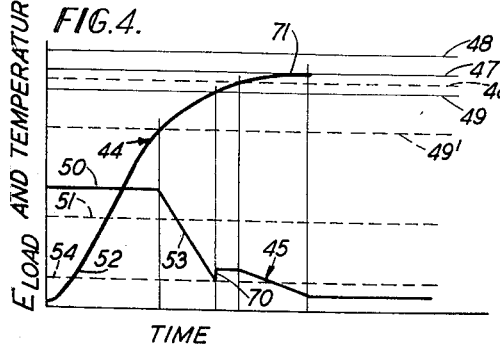
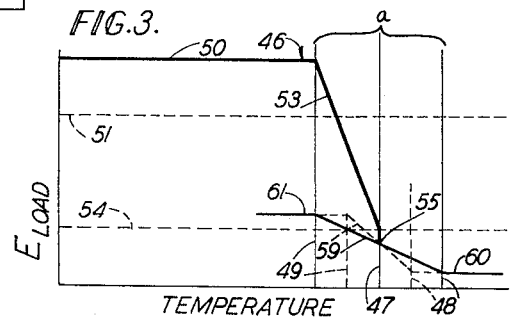
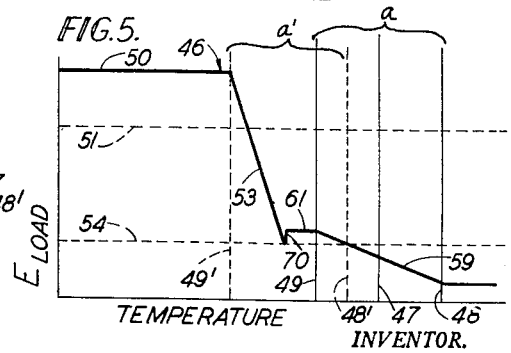
INVENTOR.
JOHN A. THOMAS
BY
ATTORNEYS United States Patent Office 3,069,087
Patented Dec. 18, 1962

3,069,087
PROPORTIONING TYPE OF CONDITION CONTROL SYSTEM
John A. Thomas, Milwaukee, Wis., assignor to Barber-Colman Company, Rockford, Ill., a corporation of Illinois
Filed Apr. 16, 1958, Ser. No. 728,913
3 Claims. (Cl. 236—15)

This invention relates generally to an automatic control system in which the amount of a control agent or controlling variable delivered to a controlled medium is regulated automatically in response to changes in a condition of the medium so as to correct for deviations of the condition from a desired value and thus maintain the condition at such value. More particuarly, the invention relates to a so-called proportioning system in which the amount of control agent delivered to the controlled medium is varied between a maximum and a minimum in proportion to the value of the controlled condition while the latter is within a predetermined range known as the proportioning band or throttling range. The condition, for example, may be the temperature of the atmosphere within a furnace, the controlled medium in this case being the atmosphere and the control agent being heat.

The primary object of the present invention is to bring the controlled condition quickly to the desired value during initial operation of a system of the above character while still providing close control so as to reduce the tendency for the condition to cycle or hunt about the desired value during continued operation.

Another object is to achieve the foregoing object by varying the maximum amount of control agent delivered to the controlled medium from a high value during initial operation of the system to a lower value after the controlled condition reaches a predetermined value in its approach to the desired value.

A further object is to achieve the desired control action during initial operation in a simple manner by changing from the higher to the lower maximum value of control agent in response to the same control signal which is used to regulate the delivery of the agent proportionally with the controlled condition when the latter is within the proportioning band.

The invention also resides in the provision of novel anticipating elements which are effective only during initial operation of the system and insure that delivery of the control agent is changed over from the higher to the lower maximum value soon enough to compensate for time lags in the system and prevent the controlled condition from going beyond the desired value.

Other objects and advantages of the invention will become apparent from the following detailed description taken in connection with the accompanying drawings, in which FIGURE 1 is a schematic view and wiring diagram of a control system embodying the novel features of the present invention.

FIGS. 2, 3, 4 and 5 are charts showing changes of different variables in the system under different operating conditions.

While the present invention is suited for the automatic control of various conditions such as pressure, temperature or flow, it is shown in the drawings for purposes of illustration in a system for controlling the temperature of the interior of a furnace 10 having an electric resistance heating element 11. Alternating current for energizing the heater is supplied by a suitable source 12 in amounts controlled by a saturable core reactor 13 having two output coils 14 connected in series with the heater across the source. The current flowing through the output coils and thus the heater varies in amplitude in a well-known manner in accordance with changes in the magnitude of direct current flowing through an input coil 15 of the reactor.

Direct current flow through the reactor input coil 15 is varied in response to changes in the furnace temperature to regulate the degree of energization of the heater 11 and thus the amount of heat delivered to the furnace 10 in a direction to correct for deviations of temperature from a desired value. The furnace temperature is sensed by a thermocouple 16 whose voltage is applied by conductors 17 to a controller 18. The latter operates on the difference between the desired furnace temperature and the temperature represented by the signal received from the thermocouple sensing circuit to produce a direct current control signal which is used to vary the energization of the reactor input coil.

In the present instance, the controller 18 comprises a D'Arsonval galvanometer 19 whose moving system includes a coil 20 connected across the conductors 17 in the thermocouple circuit and a pointer 21 movable relative to a scale 22 in accordance with changes in the voltage applied to the coil. A flag or vane 23 of conducting material carried by the pointer moves relative to a pick-up coil 24. This coil constitutes a part of one resonant circuit of an oscillator 25 which is of the same construction as that disclosed in an application of Oscar L. Welker and Lester F. Hetchler, Serial No. 505,674, filed May 3, 1955, now Patent No. 2,873,368, and operates in a similar manner with current flow in the plate circuit of the triode varying in accordance with changes in the oscillatory condition of the oscillator as determined by position of the flag relative to the pick-up coil. The plate current is varied with changes in the oscillatory condition through the provision of paralleled resistance and capacitance elements 27 and 28 in the grid circuit of the triode, these elements biasing the grid negatively to reduce plate current flow during oscillation. Power for operating the oscillator is derived from a transformer 29 having a primary 30 connected across an alternating current source 31 and a secondary 32 connected in the plate circuit of the triode.

When the furnace temperature and thus the thermocouple voltage are of low values, the flag 23 is located remotely from the pick-up coil 24 and there are no oscillations, the plate current then being of a relatively large steady value. The plate current remains at this value until the flag reaches a predetermined position within the pick-up coil where oscillations begin. As the flag moves beyond this position, the strength of the oscillations increases and the plate current decreases correspondingly in proportion to the flag movement until the strength reaches a maximum. Then, the plate current remains relatively constant at a low value. The value of thermocouple voltage at which the oscillations begin and the plate current decreases may be adjusted by mounting the pick-up coil 24 in a well-known manner (not shown) for selective movement relative to the pointer and the flag. Also, the ratio of changes of plate current to changes in flag position after oscillations begin may be adjusted by varying the value of a capacitor 33 connected between the grid and the cathode of the triode 26.

To provide a control signal or control force suitable for application to the input coil 15 of the saturable reactor 13 to regulate the energization of the heater 11, the controller 18 in this instance includes a suitable magnetic amplifier 34. The latter is supplied alternating current from the oscillator source 31 and provides across two output conductors 35 and 36 a unidirectional signal which varies substantially as a proportional function of current flow through an input coil 37 connected in the plate circuit of the oscillator triode 26. This output signal of the amplifier is applied to the reactor input coil 15 by connecting the latter to the conductors 35 and 36. Current flow through the heater 11 and thus the amount of heat or control agent delivered to the furnace 10 then follow the changes in the thermocouple signal and vary between maximum and minimum values corresponding to the maximum and minimum values of the signal.

The type of controller action provided by the control system described thus far is known as proportioning action. In such action, the amount of control agent or controlling variable delivered to a controlled medium by a regulating means in response to changes in a condition of the medium is varied in proportion to the value of the condition while the condition is within a predetermined range called the proportioning band. The direction of change in the amount of the agent is such as to correct for deviation of the condition from a desired value at the center of the proportioning band. In the present system where the controlled condition is the temperature of the atmosphere within the furnace 10, the control agent is heat and the heater 11 and the saturable reactor 13 constitute the regulating means for delivering heat in varying amounts to the furnace. The proportioning band is the range of furnace temperatures within which the output signal from the controller 18 varies with changes in the position of the flag 23 relative to the pick-up coil 24. The direction of change of the amount of heat delivered is opposite to the direction of deviation of the temperature from the desired value. For example, if the temperature is above the desired value, the energization of the heater is reduced to lower the amount of heat delivered to the furnace.

In a proportioning control system, it is desirable that, after the controlled condition has reached the desired value within the proportioning band, the maximum amount of control agent delivered to the controlling medium correspond to the maximum demand of the system, that is, the amount of control agent needed to keep the condition at the desired value. This makes possible a close control of the condition and reduces the tendency of overcorrection for deviations of the condition from the desired value. The desired maximum amount of control agent often is quite low and requires an excessive length of time to bring the controlled condition to the desired value when the system is put into operation initially and the condition deviates widely from the desired value. The present invention contemplates overcoming this difficulty and bringing the condition to the desired value quickly while still providing the close control with a low maximum amount of control agent during continued operation of the system after the desired value is reached.

In accordance with the present invention, provision is made for adjusting the maximum amount of control agent delivered to the controlled medium and reducing the same automatically from a high value effective during initial operation of the system to the low value desired during continuous operation after the condition reaches the desired value. While the maximum amount of control agent may be regulated in various ways, it is reduced in the disclosed system by varying the effective value of output signal transmitted from the controller 18 to the saturable reactor 15. For this purpose, the signal is transmitted through one or the other of two paths providing different impedances to the signal and controlled selectively by a switching means 38. The latter operates to complete a low impedance path for transmitting a large portion of the signal during the initial operation and, in response to changes in the controlled condition, interrupts the low impedance path and renders a high impedance path effective to reduce the transmitted signal during subsequent operation.

The switching means 38 in this instance is a relay having normally open contacts 39 connected in series with the reactor input coil 15 between the controller output conductors 35 and 36. When these contacts are closed, the low impedance signal path is completed through only the conductors. The entire output signal of the controller 18 then is effective to energize the reactor coil. The high impedance path extends through a variable resistor 40 connected in a shunt around the relay contacts and rendered effective to reduce the portion of the controller output signal applied to the reactor when the relay drops out and the short circuit through the contacts is interrupted. If desired, normally closed contacts 41 may be connected in series with the resistor to interrupt the high impedance path when the relay pulls in.

To vary the energization of the relay 38 in response to changes in the controlled condition, the relay coil 42 is connected in parallel with the saturable reactor coil 15. This simplifies the system by utilizing a condition responsive signal already available. Also, the normally open contacts 39 then are located in a holding circuit for the relay. The entire amplifier output signal is applied to the relay coil to pull in the relay and complete the holding circuit initially by manually closing a normally open push-button switch 43 connected in shunt with the holding contacts.

The operation of the improved control system as described thus far will be described in connection with FIGS. 2 and 3. In FIG. 2, a curve 44 represents the furnace temperature plotted against time. Also, the voltage, indicated as $E_{load}$, applied to the relay coil 42 and the reactor input coil 15 plotted against time on a curve 45. A curve 46 in FIG. 3 is a plot of $E_{load}$ against the furnace temperature. In each of these figures the desired temperature is indicated by a line 47 and the limits of the proportioning band $a$ are indicated by lines 48 and 49. Before power is available at the sources, the furnace temperature is the same as the ambient temperature.

The operation is started by making power available at the sources and closing the push-button switch 43 thereby connecting the relay coil 42 and the reactor input coil 15 directly across the controller output conductors 35 and 36 for application of the entire output signal to the coils. The furnace temperature being low at this time, the flag 23 is located remotely from the pick-up coil 24 and the oscillator 25 is non-oscillatory so that the output signal is at its maximum as indicated at 50 in FIGS. 2 and 3, this being higher than the voltage required for pull in of the relay as indicated at 51. The relay 38 then pulls in to interrupt the higher impedance path through the resistor 40 at the contacts 41 and to close the contacts 39 to complete low impedance short circuit around the resistor and the push-button switch 43. The latter then may be released and the relay will remain energized through the then closed holding contacts 39.

With the maximum amplifier output signal 50 applied to the reactor input coil 15, the degree of energization of the heater 11 is correspondingly high and heat is delivered to the furnace in large amounts so that the furnace temperature rises quickly as indicated at 52 on the curve 44. During this rise, the flag 23 moves closer to the pick-up coil 24 and, when the temperature reaches the lower limit 49 of the proportioning band $a$, oscillations begin so that the controller output signal and thus the load voltage start to decrease as indicated at 53 on the voltage curves 45 and 46. This decrease continues in proportion to increases in the temperature until the load voltage reaches the value indicated at 54 where the relay drops out. While this may occur at different temperature values within the proportioning band, herein it is shown as occurring when the temperature reaches the desired value 47.

As soon as the relay drops out, the low impedance short circuit and the relay circuit are interrupted at the normally open contacts 39 and the other contacts 41 close to complete the high impedance path through the resistor 40. Part of the power in the amplifier output signal then is absorbed in the resistor so that the load voltage applied to the reactor coil 15 drops immediately to a lower value as indicated at 55. Although this value of load voltage is adjusted so that the corresponding amount of heat supplied by the heater 11 equals the anticipated heat loss from the furnace 10 while the temperature is at the desired value 47, the temperature continues to rise as indicated at 56 due to thermal inertia of the system and actually overshoots or exceeds the desired value, the load voltage continuing to decrease as the temperature rises.

The thermal inertia in the system results in a time lag between changes in the energization of the heater 11 and the consequent changes in the furnace temperature. Eventually, however, the decrease of energization of the heater due to the initial overshoot 56 is followed by decrease of the temperature as indicated at 57 to the desired value 47. During this decrease, the load voltage increases as indicated at 58 in FIG. 2. As soon as the high impedance path through the resistor 40 becomes effective and while the temperature is within the proportioning band a, the load voltage varies linearly with the temperature as indicated by a line 59 in FIG. 3 between the minimum indicated at 60 and a maximum 61 which is lower than the initial maximum 50. When the temperature goes beyond the limits of the proportioning band in either direction, the load voltage remains at the corresponding maximum or minimum value.

The lower maximum value 61 of load voltage makes it possible to maintain the temperature closely at the desired value 47 in spite of changes in factors such as the heat losses from the furnace and the voltage supplied by the heater source 12. Even closer control may be obtained if desired by adjusting the capacitor 33 in the oscillator 25 to narrow the proportioning band as indicated by the dotted lines on FIG. 3. This results in an increase in the slope of the line 59, that is, ratio of heat changes to temperature changes, and reduces the tendency for offset or droop. The latter is a sustained deviation of the temperature from the desired value resulting from a change in the demand of the system.

In some cases, the overshoot 56 resulting initially from the thermal inertia and the delivery of heat at the higher maximum load voltage 50 is undesirable. To overcome such overshoot, the invention also contemplates the provision of novel anticipating elements which compensate for the inertia and enable the temperature to be brought quickly up to the desired value 47 without going beyond during the initial operation. For this purpose, the elements introduce an error signal into the system so that load voltage starts its proportional decrease with the increasing temperature before the temperature actually reaches the proportioning band a. In other words, the proportioning band in effect is shifted downscale so that the relay 38 drops out to reduce the maximum load voltage to its lower value 61 before enough heat has been delivered to cause the overshoot. During continued operation, the anticipating elements are disabled so as to remove the error signal.

The error signal in the present instance is a unidirectional voltage signal applied to the thermocouple or sensing circuit which, for this purpose, includes a resistor 62 in series with one of the conductors 17 (FIG. 1). The voltage is derived from the heater source 12 through a transformer 63 having a secondary 64 connected in series with the resistor 62 and a rectifier 65. The latter is polarized so that the voltage across the resistor is added to that of the thermocouple. This voltage is smoothed by suitable resistance and capacitance elements 66 and 67 and a variable resistor 68 is connected in series with the secondary for adjustment of the value of the voltage.

To disable the anticipating elements after the furnace temperature reaches the desired value 47 initially, advantage is taken of the relay 38. The latter thus includes another set of normally open contacts 69 which are connected in series with the rectifier. These contacts are closed during the initial operation, but open to remove the error voltage when the relay drops out.

As described above, the error voltage has the effect of shifting the proportioning band a downscale. This will be seen from FIGS. 4 and 5 which illustrate the operation with the anticipating elements added. In these figures, the curves 44, 45 and 46 of the furnace temperature and $E_{load}$ and the limits 48 and 49 of the proportioning band a are numbered the same as in FIGS. 2 and 3. The apparent proportioning band and its limits are shown by the dotted lines bearing similar but primed reference characters.

In the operation of the system with the anticipating elements, the relay 38 is pulled in initially to complete its holding circuit and the low impedance shunt around the resistor 40 at the contacts 39 and to close the error signal circuit at the contacts 69. The heater 11 then is energized at its higher maximum value 50 of load voltage on the curves 45 and 46 and the furnace temperature rises quickly as indicated at 52 on the curve 44 until it reaches the lower limit 49' of the apparent proportioning band a'. Then, the load voltage decreases proportionally with the temperature as indicated at 53 and toward the relay drop-out value 54. When this value is reached, the relay drops out to interrupt the error signal circuit and the low impedance shunt at the contacts 69 and 39 and complete the high impedance path through the resistor 40 at the contacts 39.

The completion of the high impedance path results in reduction of the portion of the amplifier output signal which is applied to the reactor input coil 15. However, removal of the error signal results in an increase in the total output signal and this increase is large enough that the voltage applied to the reactor coil actually rises as indicated at 70 on the curves 45 and 46. The temperature then being below the actual proportioning band a, the load voltage increases to the low maximum 61 where it remains while the temperature increases toward the actual band. Once the latter is reached, the load voltage decreases proportionally with the temperature along the line 59 (FIG. 5) as when operating in the manner described above without the anticipating elements. The approach of the temperature to the proportioning band and the desired value is slower however because less heat is being delivered. This more gradual approach is indicated at 71 on the curve 44 from which it will be seen that there is no overshoot of the desired temperature.

I claim as my invention:

1. A condition controlling system having, in combination, a condition sensing circuit for providing a control signal which is of given amplitude when the condition is beyond a given range of deviation from a desired value and which decreases proportionally with the reduction of the deviation within said range, a regulator adjustable to correct for deviations of said condition from the desired value within said range, a relay having first and second pairs of normally open switching contacts and a third pair of normally closed switching contacts, an anticipating circuit including said first pair of switching contacts operable when closed to introduce an error signal into said sensing circuit to cause said control signal to vary proportionally with said condition prematurely before the condition reaches said range, a low impedance path including said second pair of switching contacts operable when closed to transmit a major portion of said control signal to said regulator to produce correspondingly large corrective actions, a second high impedance path having higher impedance than said low impedance path and including said third pair of switching contacts operable when opened to transmit a smaller portion of said control signal to said regulator to provide correspondingly smaller corrective actions, and an actuator for said relay responsive to said control signal when said signal is of said given amplitude, said actuator restoring the relay switches to their normal condition when said control signal decreases from said given amplitude during said premature changes of the signal with said condition.

2. A condition controlling system having, in combination, a condition sensing circuit for providing a control signal which is of given amplitude when the condition is beyond a given range of deviation from a desired value and which decreases proportionally with the reduction of the deviation within said range, a regulator adjustable to correct for deviations of said condition from the desired value within said range, an anticipating circuit operable when closed to introduce an error signal into said sensing circuit to cause said control signal to vary proportionally with said condition prematurely during initial operation before the condition reaches said range, a low impedance path operable when closed to transmit a major portion of said control signal to said regulator to produce correspondingly large corrective actions, a second high impedance path having higher impedance than said low impedance path and operable when rendered effective to transmit a smaller portion of said control signal to said regulator to provide correspondingly smaller corrective actions, and a relay actuated by an initiating switch and maintained in actuated condition in response to maintenance of said control signal at said given amplitude to close said anticipating circuit and said low impedance path, said relay operating to interrupt said anticipating circuit and low impedance path and render said high impedance circuit effective in response to decrease of said control signal from said high value during said premature changes of the signal with said condition.

3. A condition controlling system having, in combination, a condition sensing circuit for providing a control signal which is of given amplitude when the condition is beyond a given range of deviation from a desired valve and which decreases proportionally with the reduction of the deviation within said range, a regulator adjustable to correct for deviations of said condition from the desired value within said range, transmitting elements applying said control signal to said regulator to adjust the latter and produce corrective actions in response to changes in the signal, said transmitting elements being adjustable to vary the effective value of the signal and thus the amount of said corrective actions, anticipating elements associated with said sensing apparatus and introducing thereto an error signal for premature reduction of said control signal proportionally with said condition before the condition reaches said range in the initial operation of the system, a relay connected when deenergized to adjust the transmitting elements to reduce the effective value of the control signal applied to said regulator and to remove said error signal, and a starting switch for initially energizing said relay by said condition sensing circuit, the energization of said relay being responsive to the maintenance of a control signal of said given amplitude from said source whereby the relay is deenergized upon said premature reduction of said control signal.

References Cited in the file of this patent

UNITED STATES PATENTS

| | | |
|---|---|---|
| 1,695,853 | Lincoln | Dec. 18, 1928 |
| 2,079,497 | Wilhjelm | May 4, 1937 |
| 2,085,855 | Hunt | July 6, 1937 |
| 2,121,977 | Newell | June 28, 1938 |
| 2,366,500 | Eastin | Jan. 2, 1945 |
| 2,414,314 | Machlet | Jan. 14, 1947 |
| 2,487,556 | Jenkins | Nov. 8, 1949 |
| 2,496,860 | Davis | Feb. 7, 1950 |
| 2,835,450 | Brown | May 20, 1958 |